Nov. 11, 1958 N. LEWEN ET AL 2,860,188
CIRCUIT ARRANGEMENT FOR LOGICALLY HANDLING PROCEDURES WHICH ARRIVE AT ANY TIME
Filed April 29, 1953
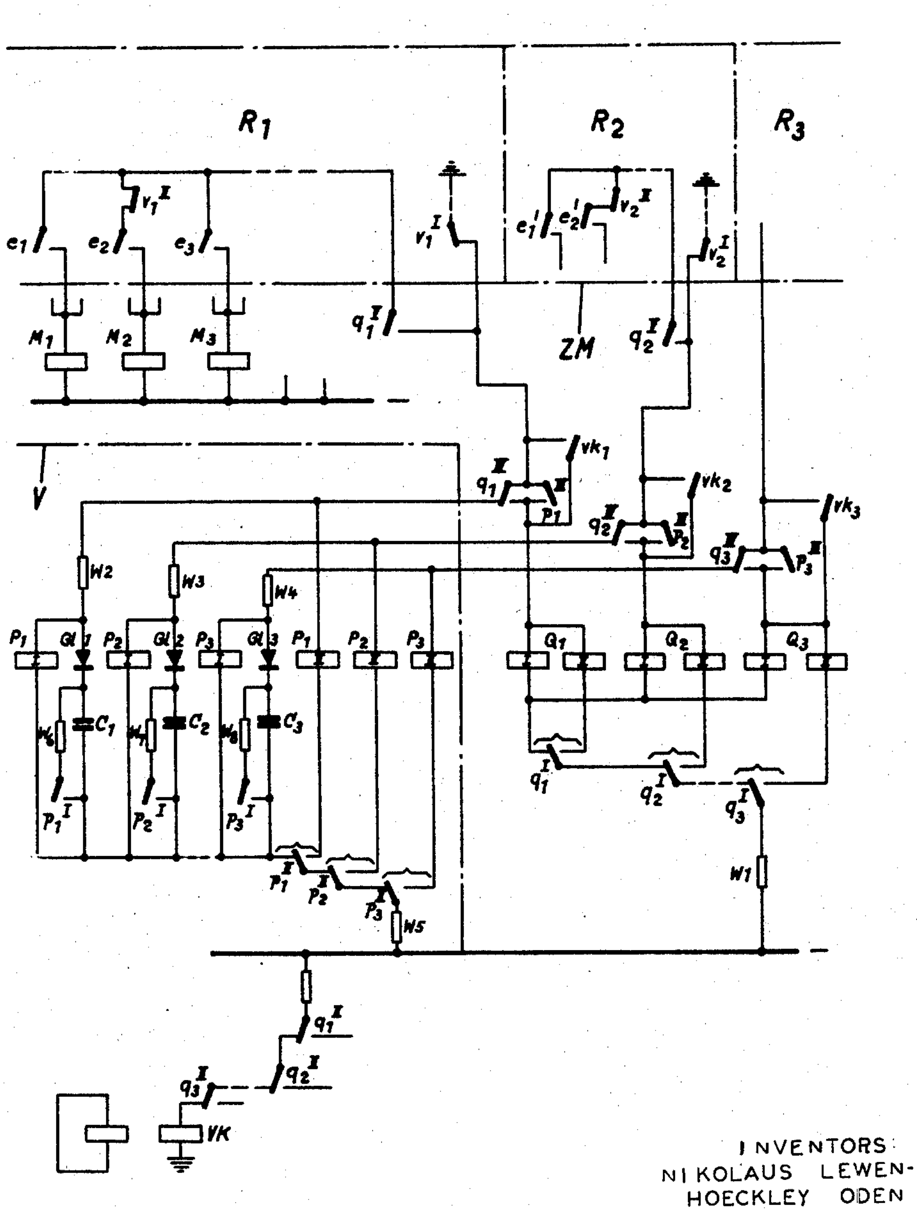
INVENTORS
NIKOLAUS LEWEN-
HOECKLEY ODEN
BY Robert Harding Jr.
ATTORNEY United States Patent Office 2,860,188

Patented Nov. 11, 1958

2,860,188

CIRCUIT ARRANGEMENT FOR LOGICALLY HANDLING PROCEDURES WHICH ARRIVE AT ANY TIME

Nikolaus Lewen, Stuttgart, and Hoeckley Oden, Stuttgart-Stammheim, Germany, assignors to International Standard Electric Corporation, New York, N. Y., a corporation of Delaware Application April 29, 1953, Serial No. 351,994

Claims priority, application Germany May 2, 1952

11 Claims. (Cl. 179—18)

The invention pertains to a circuit arrangement for telecommunication systems, particularly telephone plants, which, using relay-like switches, makes a logical handling of procedures arriving at any time possible without loss of time.

In telecommunications engineering a common control equipment frequently exists, which selectively has access to several other equal valued individual equipments. Such arrangements are known in line finder systems, in which a signal call distributor comprises a common control equipment which has one-at-a-time acess to a certain number of equal valued individual equipments comprising line finders. Another form is found in marker systems wherein a central marker can be selectively circuited to several equivalent registers.

The establishing of the connection of a common equipment with several other individual equipments can be effected over selectors. In this case the common equipment is associated with the wiper and the equipments which can be connected selectively are distributed over the contacts of the wiper path. The use of selectors as connecting organs, however, always requires a certain loss of time, which is dependent upon the switching speed of the connecting selector used. Besides, a selector does not permit a logical handling of the desired connections.

In order to accomplish the connections of the central equipment to the other equally valued individual equipments in a shorter length of time, chain circuits consisting of relay contacts can be used. Hereby the connection is made much faster, whereby simultaneously the demand is met that in each case only one out of a number of individual equipments can be connected with the common equipment. Known relay chain circuits, however, have the disadvantage that in those cases, where simultaneously several equal individual equipments are ready for a connection to the common equipment, that individual equipment is given preference which lies closest to the potential source. Therefore, the majority of individual equipments on hand lying at the end of the chain are slighted or even overlooked.

Therefore, a circuit arrangement according to the invention is suggested wherein improved relay chain apparatus is provided which functions to logically connect in each case only one out of a number of individual equipments to the common equipment even when several individual equipments are simultaneously or nearly simultaneously ready for connection to the common equipment and the common equipment is busy; this is accomplished in that a first relay chain is provided which normally functions alone to connect any readied individual equipment to the idle common equipment, together with a second, or reserve, relay chain which is activated when the common equipment is busy to accept a readied individual equipment for preferential connection with the common equipment when it becomes free.

Operation-retarded means is provided to delay the operation of the reserve chain long enough to permit the first chain to function if the common equipment is idle.

The attached figure is a schematic diagram of one embodiment of the invention. An example has been selected for explanation in which several registers ($R_{1-3}$) selectively have access to a central marking equipment (ZM).

The central marking equipment is shown by the relays $M_{1-3}$ . . . Operation of one of these relays marks the desired traffic direction in each case. In the registers the number dialed is marked by the closing of the contacts $e_1$, $e_2$ ($e'_1$, $e'_2$). Thus the setting of the contacts $e_1$, $e_2$, etc. in a known manner by the register will determine which of the marker relays $M_{1-3}$ will be operated. The demand of the central marker is effected by the individual registers in each case after the dialing of the marking number has been completed, the circuit being closed by the $v$-contacts ($v_1^{I}$, $v_2^{I}$) assigned to the registers. This manner of controlling the marker by the register forms no part of the present invention.

These $v$-contacts also affect a common chain of Q-relays arranged in the marker. In each case a Q-relay in the central marker marks a certain register. In order to assure that simultaneously only one register is connected to the central marker the chain of contacts $q_1^{I}$, $q_2^{I}$ . . . have to be closed when the central marker is seized. The Q-relay of the seizing register operates over its operating winding I, which, after the chain of $q$-contacts has been broken, holds itself over its holding winding II and, depending on the setting of the register, operates the M-relay assigned to the register previously set, which relay is located in the central marker for marking purposes.

In those cases where a seizing register finds the marker free, a multi-contact relay VK sees to it that the $v$-contacts assigned to the registers are directly connected to the Q-relays in the markers by means of the contacts $vk_{1-3}$. The operation of the multi-contact relay VK depends upon the closed or open condition of a chain of contacts ($q_1^{II}$, $q_2^{II}$ . . .).

However, if a register desires a connection with the centralized marker just at that moment when it is already busied by another register, then the operation of that Q-relay the register of which has already seized the marker opens the chain for relay VK so that it is not operated.

In order to demonstrate the switching procedures in a practical example, it is assumed that register $R_1$ has already seized the centralized equipment for marking purposes, and is holding it over ground, back contact $v_1^{I}$, front contact $q_1^{IV}$, relay $Q_1^{(II)}$, contact $Q_1^{I}$, contact $q_2^{I}$ . . . resistance $W_1$. Then due to opening of contact $q_1^{II}$ the circuit for the multi-contact relay VK is interrupted. Therefore, its contacts $vk_1$, $vk_2$ . . . are also open. After register $R_2$ has set and its contact $v_2^{I}$ releases after the marking digit has been received, then the seizing chain of the centralized marker ($Q_1$, $Q_2$ . . .) cannot be reached due to the open condition of contact $vk_2$. Ground potential coming from $v_2^{I}$ is therefore conducted to minus over contact $q_2^{IV}$, resistance $w_3$, rectifier GL2 condenser $C_2$, a chain of $p$-contacts and resistance $w_5$. The equipment consisting of the condensers $C_{1-3}$ and relays $P_{1-3}$ is the reserve chain V, which then operates when the centralized marker is already busied by a register. By means of this reserve chain V it is achieved that the register waiting the longest causes circuit functions which assure a consistent queing of the individual marking procedures.

The releasing of the above mentioned contact $v_2^{I}$ assigned to register $R_2$ causes condenser $C_2$ to become charged. The charging time of this condenser corresponds approximately to that of a marking procedure of the centralized marker. When condenser $C_2$ has reached the operating potential of the relay $P_2$ circuited parallel thereto, then it operates over its winding I. By means of contact $p_2^{II}$ relay $P_2$ obtains holding current over its winding II simultaneously interrupting the chain of $p^{II}$ contacts in the distributing equipment. Besides a contact $p_2^{I}$, short circuits and discharges the condenser $C_2$ over a resistance $w_7$. Furthermore, relay $P_2$ with contact $p_2^{III}$ shunts open contact VK2 to cause the marker to be seized by switching on of relay $Q_2$ as soon as the marking procedure for the first register has been completed. The completion of this marking procedure is indicated by the releasing of contact $q_1^{I}$. Then the chain of contacts $q_1^{I}$, $q_1^{I}$ . . . closes and relay $Q_2$ can operate against minus over resistance $w_1$ before slow-operating relay VK (slowed by its shorted second winding) can operate. Contact $q_2^{I}$ immediately opens the chain of $q$-contacts and relay $Q_2$ holds itself over its front contact $Q_2^{IV}$ and its winding II. The P-chain is cleared by the opening of back contact $Q_2^{IV}$. Hereby the centralized marker is again busied and further registers which are ready for a connection to this marker are conducted to the distributor equipment and, corresponding to the time of their seizure, charge the condensers assigned to them and cause the operation of the corresponding P-relays. In each case that P-relay is first operated the parallel circuited condenser of which has first completed charging. Thereby a just handling of the registers busying the centralized marker is assured. In order to avoid an equalization charge in the condensers ($C_{1-3}$) circuited parallelly in distributor V, the charging circuits of the individual condensers are de-coupled by the rectifiers (GL1 to GL3).

Except for the noted rectifiers, charge-equalization current would flow while any P relay holds the P-chain open. With equalization prevented, however, any partly charged condenser C holds its partial charge during the time the P-chain is open, and resumes its interrupted charging process when the P-chain is again closed. The running of the charging-time delay interval of any condenser C is thus held in abeyance during any such intervening open interval of the P-chain.

The operation of the circuit may be further clarified in the following manner, assuming the marker to be engaged with one of the registers and one of the P relays to be operated and that a number of registers have previously and successively made demands for the marker: The previous demands for the marker will have caused the condensers associated with the respective registers to start charging, which charging stopped when the P relay operated. The charges on the several condensers will then be lined up as in a race, with the charge on the condenser associated with the first demanding register ahead of all of the others. The "race" has been temporarily halted during the time one of the P relays is operated. When the marker finishes with the register with which it is previously engaged, the next Q relay associated with the operated P relay operates and connects the marker to the associated register. At the same time the operation of the Q relay is released, the operated P relay and the P relay chain is again completed. The "race" now starts again, each condenser associated with a demanding register increasing its charge, until finally one condenser reaches the "finish line" at which its voltage is sufficient to operate the associated P relay. The P relay operates, halts the "race" again temporarily, discharges the condenser associated with the operated P relay, thus moving the associated register back to the "start line" again, and prepares the associated Q relay to connect the associated register with the marker as soon as the marker becomes free.

The "race" thus proceeds intermittently, stopping each time a P relay operates and starting each time a P relay releases, and each time a P relay operates, the associated condenser is discharged, so that it must go back to the "start line" again. Thus, all of the registers are connected in the order in which they make their demands, with the possible exception of registers which simultaneously demand during the period in which a P relay is operated. In such a case, which register will be operated before the others will be determined by the value of the various individual circuits.

While we have described above the principles of our invention in connection with specific apparatus, it is to be clearly understood that this description is made only by way of example and not as a limitation to the scope of our invention.

What is claimed:

1. In combination, a group of individual equipments and a common equipment for use with any one of them, each individual equipment including means for making a demand for connection of the common equipment therewith and for thereafter terminating such demand, first relays corresponding respectively to the individual equipments, means for initiating the operation of any first relay responsive to said demand means of its associated individual equipment, means controlled by the first relays for insuring that only one of them is effectively operated at any time, second relays corresponding respectively to the first relays and to the individual equipments, means for operating any second relay responsive to operation of its corresponding first relay, means controlled by the second relays for insuring that only one of them is effectively operated at any time, means responsive to the operation of any second relay for connecting the common equipment to its associated individual equipment, and means for causing the restoration of any operated second relay responsive to the termination of the demand by said corresponding demand means.

2. In a combination according to claim 1, means rendering any second relay directly responsive to a demand of its associated individual equipment occurring while all second relays are restored.

3. In a combination according to claim 1, means responsive to the operation of a second relay under control of an operated first relay for restoring the operated first relay and for rendering it non-responsive to the continuation of the demand of its associated individual equipment, whereby the remaining first relays are thereupon conditioned to accept the demand of a further individual equipment.

4. In a combination according to claim 3, means causing the first relays to accept overlapping demands in the order of their respective occurrences, said means comprising similar timing devices associated respectively with the first relays and including means for delaying the operation thereof in response to a said demand for an interval related to the time during which a second relay maintains the common equipment connected to an individual equipment.

5. A combination according to claim 4, in which each delay means comprises a condenser, means for charging any said condenser responsive to an associated demand, and means for operating the associated first relay when said condenser has been charged a predetermined amount.

6. A combination according to claim 5, in which each delaying means further comprises a unidirectional current carrying device in series with the condenser.

7. A combination according to claim 5, further comprising means controlled by the operation of a first relay for discharging the associated delay condenser.

8. In a combination according to claim 4, means for further enhancing the acceptance of overlapping demands in the order of their respective occurrences, said means comprising means for adding to the said delay interval of any first relay an interval corresponding to the interval during which any intervening first relay is operated.

9. In combination, a group of individual equipments and a common equipment for use with any one of them, each individual equipment including means for making a demand for connection of the common equipment therewith and for thereafter terminating such demand, pairs of relays corresponding respectively to the individual equipments, each pair comprising a first relay and a second relay, means controlled by the first relays for insuring that only one of them is effectively operated at any time, means controlled by the second relays for insuring that only one of them is effectively operated at any time, means rendering any relay of any pair operable in response to any said demand of the associated individual equipment, said rendering means including means for causing one relay of any pair to operate responsive to a demand of the associated individual equipment and including means for causing the other relay of any other pair to operate responsive to an overlapping demand of the associated individual equipment, means responsive to the operation of said one relay for connecting the common equipment exclusively to the corresponding individual equipment until the demand thereof is terminated, and means responsive to the termination of the last said demand for disconnecting the common equipment from the concerned individual equipment and for connecting it exclusively to the individual equipment corresponding to the operated second relay.

10. In a combination according to claim 9, means for preventing the two relays of any pair from operating in effective independence in response to a single said demand.

11. An order-of-access arrangement for a switching system comprising a group of individual equipments and a common equipment for use with any one of them, each individual equipment including means for making a demand for connection of the common equipment therewith and for thereafter terminating such demand, a plurality of condensers corresponding respectively to the individual equipments, a plurality of relays corresponding respectively to the individual equipments, a source of potential, individual circuit means, responsive to demands from individual equipments, for causing the charging of said condensers, means operated by the engagement of said common equipment by an individual equipment for opening the individual circuit means associated with the engaged individual equipment, means for operating each of said relays when the charge on the associated condenser reaches a predetermined value, means for interrupting all of said individual circuit means when any one of said relays operates, said interrupting means including means for preventing the operation of any other relay, means responsive to the operation of any of said relays for preparing said common equipment for engagement with the individual equipment associated with the operated relay, means in the common equipment responsive to the termination of a demand from an individual equipment for connecting said common equipment with the particular individual equipment the connection of which has been prepared by said preparing means, and means for releasing an operated relay when the associated individual equipment has been connected to said common equipment.

References Cited in the file of this patent

UNITED STATES PATENTS

| | | |
|---|---|---|
| 1,421,864 | Turner | July 4, 1922 |
| 1,695,908 | White et al. | Dec. 8, 1928 |
| 2,562,100 | Holden | July 24, 1951 |
| 2,578,701 | Hecht | Dec. 18, 1951 |